(12) United States Patent
Hoglund et al.

(10) Patent No.: US 9,792,444 B2
(45) Date of Patent: *Oct. 17, 2017

(54) INOCULATOR AND ANTIBODY FOR COMPUTER SECURITY

(71) Applicant: CounterTack, Inc., Santa Monica, CA (US)

(72) Inventors: Michael Gregory Hoglund, Monte Sereno, CA (US); Shawn Michael Bracken, Pinole, CA (US)

(73) Assignee: CounterTack, Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/063,312

(22) Filed: Mar. 7, 2016

(65) Prior Publication Data

US 2016/0292424 A1    Oct. 6, 2016

Related U.S. Application Data (63) Continuation of application No. 13/200,504, filed on Sep. 23, 2011, now Pat. No. 9,311,482.

(60) Provisional application No. 61/456,192, filed on Nov. 1, 2010.

(51) Int. Cl.
  *G06F 21/57* (2013.01)
  *G06F 21/56* (2013.01)

(52) U.S. Cl.
  CPC .......... *G06F 21/577* (2013.01); *G06F 21/568* (2013.01); *G06F 21/57* (2013.01)

(58) Field of Classification Search
  CPC ............................... G06F 21/568; G06F 21/56

USPC .......................................................... 726/25
See application file for complete search history.

(56) References Cited

U.S. PATENT DOCUMENTS

| | | |
|---|---|---|
| 7,665,123 B1 | 2/2010 | Szor et al. |
| 8,769,685 B1 | 7/2014 | Conrad et al. |
| 2004/0025052 A1 | 2/2004 | Dickenson |
| 2004/0230828 A1 | 11/2004 | DeFuria et al. |
| 2005/0223238 A1 | 10/2005 | Schmid et al. |
| 2006/0041942 A1 | 2/2006 | Edwards |
| 2007/0143843 A1 | 6/2007 | Nason et al. |
| 2007/0233984 A1* | 10/2007 | Mondello ............... G11C 8/20 711/163 |
| 2008/0120611 A1* | 5/2008 | Aaron .................... G06F 21/51 717/174 |
| 2008/0140968 A1 | 6/2008 | Doshi et al. |

(Continued)

OTHER PUBLICATIONS

Kim, "Securing heap memory by data pointing encoding", Mar. 2011, Future Generation Computer Systems, p. 1252-1257.*

(Continued)

*Primary Examiner* — Morshed Mehedi
*Assistant Examiner* — Gregory Lane
(74) *Attorney, Agent, or Firm* — Morgan, Lewis & Bockius LLP (57) ABSTRACT

In an embodiment of the invention, a method includes: determining, in a computer, an area where an undesired computer program will reside; and providing a data object in the area, so that the data object is an antibody that provides security to the computer and immunity against the undesired program. Another embodiment of the invention also provides an apparatus (or system) that can be configured to perform at least some of the above functionalities.

20 Claims, 3 Drawing Sheets

(56) References Cited

U.S. PATENT DOCUMENTS

| | | | |
|---|---|---|---|
| 2008/0208924 | A1 | 8/2008 | Bradshaw et al. |
| 2008/0208927 | A1 | 8/2008 | Bradshaw et al. |
| 2008/0244155 | A1 | 10/2008 | Lee et al. |
| 2009/0126022 | A1 | 5/2009 | Sakaki |
| 2010/0023522 | A1 | 1/2010 | George et al. |
| 2010/0043072 | A1 | 2/2010 | Rothwell |
| 2010/0070724 | A1* | 3/2010 | Ito ............... G06F 11/1453 711/162 |
| 2010/0095365 | A1* | 4/2010 | Hsu ............... G06F 21/85 726/11 |
| 2010/0100966 | A1 | 4/2010 | Hamid |
| 2010/0138623 | A1 | 6/2010 | De Santis et al. |
| 2010/0333169 | A1 | 12/2010 | Hopen et al. |
| 2012/0060217 | A1 | 3/2012 | Sallam |

OTHER PUBLICATIONS

Forcht, Bolstering Your Computer's Immune System, Nov. 10, 2015, ASIS International/ProQuest, 8 pgs.
Hbgary, Inc., International Search Report and Written Opinion, PCT/US2011/058653, Mar. 19, 2012, 6 pgs.
Hbgary, Inc., International Preliminary Report on Patentability, PCT/US2011/058653, May 8, 2013, 5 pgs.
Hbgary, Inc., Search History for PCT/US2011/058653 dated Feb. 25, 2012, 3 pgs.
Hbgary, Inc., Extended European Search Report dated Jul. 30, 2014 directed to EP Application No. 11838637.4, 6 pgs.
Hbgary, Inc., Notification Prior to Examination, IL226098, Apr. 13, 2015, 3 pgs.
Hbgary, Inc., Notification of Reasons for Refusal, JP2013537752, Oct. 5, 2015, 3 pgs.
Hbgary, Inc., Decision to Grant, JP2013537752, May 12, 2016, 5 pgs.
Hbgary, Inc., Notification of the Third Office Action, CN201180060514.0, Aug. 1, 2016, 10 pgs.
Hbgary, Inc., First Examination Report dated Jan. 3, 2014, directed to NZ Application No. 610714, 2 pgs.
Hoglund, Office Action, U.S. Appl. No. 13/200,504, filed Nov. 27, 2012, 14 pgs.
Hoglund, Final Office Action, U.S. Appl. No. 13/200,504, filed Jul. 3, 2013, 19 pgs.
Hoglund, Office Action, U.S. Appl. No. 13/200,504, filed Mar. 20, 2014, 20 pgs.
Hoglund, Final Office Action, U.S. Appl. No. 13/200,504, filed Jan. 2, 2015, 23 pgs.
Hoglund, Notice of Allowance, U.S. Appl. No. 13/200,504, filed Dec. 2, 2015, 9 pgs.
Winability Software Corp., "Folder Guard User's Guide—Using the filters," retrieved Apr. 7, 2005 from gttp://web.archive.org/web/20041023085327/www.winability.com/folderguard/users-guide_filters.htm, 6 pgs.
Abhishek Bhatnagar, "Free USB Flash Drive Protector," Jul. 17, 2009, retrieved from http://web/archive.org/web/20090827091421/http:www.technixupdate.com/free-usb-flash-drive-protector-create-undeletable-write-protected-dummy-autoruninf-stop-autorun-virus-infection, 1 pg.
Google, "usbdummyprotect," Oct. 16, 2010, retrieved from https://code.google.com/archive/p/usbdummyprotect/, 2 pgs.
Hbgary, Inc., Communication Pursuant to Article 94(3) EP11838637.4, Jan. 24, 2017, 4 pgs.
Hbgary, Inc., Office Action, CN201180060514.0, Mar. 2, 2017, 18 pgs.

* cited by examiner

INOCULATOR AND ANTIBODY FOR COMPUTER SECURITY

CROSS-REFERENCE TO RELATED APPLICATION

This application is a continuation of U.S. patent application Ser. No. 13/200,504 filed Sep. 23, 2011 which claims priority and benefit of U.S. Provisional Application No. 61/456,192 filed Nov. 1, 2010, both of which incorporated herein by reference in their entirety.

BACKGROUND

Undesired programs, such as malware, are computer programs or software that perform actions on a computer (or computer system) without the consent of the computer user. Malware can include, for example, viruses, worms, Trojan horses, backdoors, spyware, adware, botnets, or other malware or other programs that can have a malicious effect (or perform other undesired functions) on a computer. A malicious effect on a computer is, for example, when the computer (or computer resources or objects) becomes damaged, disrupted, corrupted, undesirably burdened, or otherwise affected in an undesirable manner. As known to those skilled in the art, what is undesirable to a user may actually be desirable to another user or may even be a viable software product of a vendor or software tool in the malware testing procedures.

As some specific examples, botnets are software agents used to create and send spam, malware, or viruses, or flood a network with messages such as a denial of service attack. Spyware is a type of malware that can be installed on computers and collects information about users without their knowledge. Viruses are programs that can damage or disrupt programs or computers, and can reproduce itself and infect other programs or computers.

Current approaches to cleaning (e.g., removing, deleting, or quarantining) of undesired programs or preventing infections of undesired programs require, for example, the use of software agents, active running code (processes), or behavioral blocking software. For example, firewalls are used to block known malware, but uses computer resources to function. Conventional malware protection solutions may often be expensive and difficult for large businesses (or organizations) to maintain.

Some specific non-malicious computer programs may also be undesired by a business. For example, a business (e.g., a large corporation) may not want peer-to-peer file-sharing programs (or other types of computer programs) in the network of the business. Additionally, these non-malicious undesired programs can consume computer resources such as, for example, hardware resources (e.g., memory space and/or processor resource) and/or software resources (e.g., operating system tasks). Therefore, a computer user may desire to prevent the installment of particular computer programs that are not necessarily malicious code.

When a user discovers the presence of an undesired computer program in a computer (or the presence of an undesired program in devices in a network, or the presence of an undesired program in a portable computing device such as, for example, a personal digital assistant, smart phone, iPad, or iPhone), the user can usually remove the undesired program by use of a currently available solution. For example, current software programs are available to remove malware or viruses in a computer. However, the computer can often be re-infected by the same undesired program. If the re-infection rate is high (e.g., approximately 50% or greater), then the cost of maintaining the computer will become expensive for a business, particularly if multiple computers become re-infected with the same undesired program.

This increased cost is likely incurred if the business uses an "enterprise system" which is a large-scale, organization-wide, integrated application-software package. For example, if a business is re-imaging a computer for use with or as part of the enterprise system, and after analyzing the re-imaged computer, the re-imaged computer is found to be infected or re-infected by an undesired program (e.g., malware or virus) that has previously infiltrated the computers of the business, then the procedure of having to remove the re-infection will lead to increased costs for the business.

The current technology does not provide a less complicated and less expensive approach to preventing the re-infection of computers or networked devices. Therefore, the current technology is limited in its capabilities and suffers from at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components, modules, software, programmed code, and/or methods, to provide a thorough understanding of embodiments of the invention. One skilled in the relevant art will recognize, however, that an embodiment of the invention can be practiced without one or more of the specific details, or with other apparatus, systems, methods, modules, software, programmed code, components, materials, parts, and/or the like. In other instances, well-known structures, materials, modules, software, programmed code, or operations are not shown or described in detail to avoid obscuring aspects of embodiments of the invention. Additionally, the figures are representative in nature and their shapes are not intended to illustrate the precise shape or precise size of any element and are not intended to limit the scope of the invention.

Figure 1:
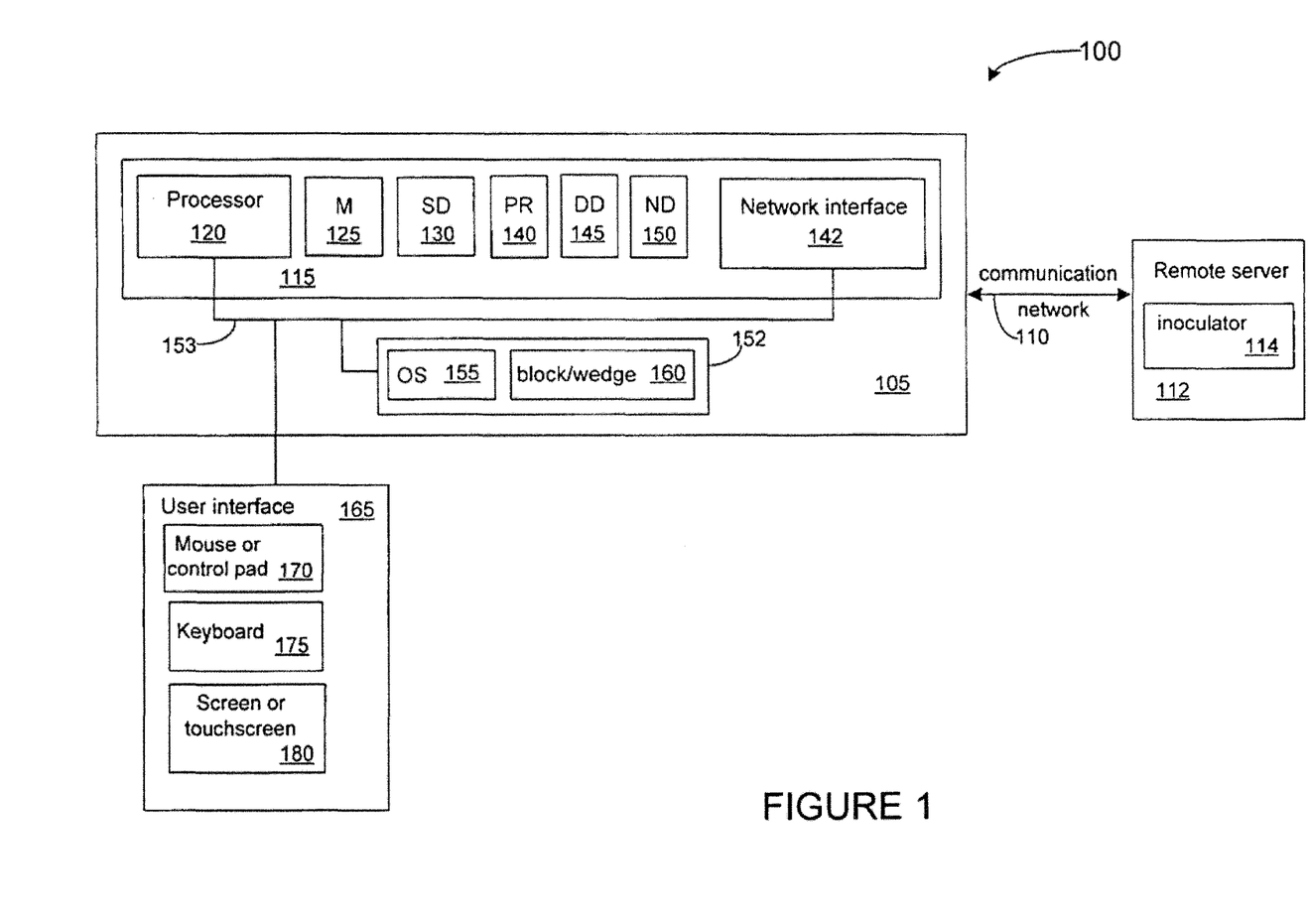
FIG. 1 is a block diagram of an apparatus (system) in accordance with an embodiment of the invention.

FIG. 1 is a block diagram of an apparatus (system) 100 in accordance with an embodiment of the invention, or is a block diagram an apparatus (system) that can be used in an embodiment of the invention. An example computing device 105 (or computer 105) is connectable to and can communicate along a communication network 110. Therefore, the computing device 105 can communicate with and download data objects or programs from a remote server 112 via the network 110. An inoculator engine 114 in accordance with an embodiment of the invention will operate on the platform of the server 114, and the functionality of the inoculator engine 114 will be discussed below.

The computing device 105 can be, for example and without limitations, a computer (e.g., a personal computer), server, workstation, mainframe computer, minicomputer, microcomputer, notebook or laptop computer, palmtop, a smart device (e.g., a smart printer, smart camera, smart scanner, or other smart devices), or a portable computing device (e.g., cell phone, smart phone, personal digital assistant, iPad, iPhone, or other portable computing devices), or another type of computer.

The communication network 110 is, for example and without limitations, a public network such as a wide area network (e.g., Internet), a local area network (LAN), or a different type of private network, semi-private, or public network. The link(s) forming the network 110 can be wired, wireless, or a combination of both.

The computing device 105 includes standard elements 115 that are used in computing operations or data transmissions. Some of the elements 115 shown in FIG. 1 are hardware elements or objects (e.g., disk drivers). Of course, the components in the elements 115 may vary depending on the type of computing device. For example, some hardware elements in a personal computer can vary in comparison to the hardware elements in a PDA or smart phone. As an example, the elements 115 include a processor 120, one or more memory devices 125, storage devices 130 such as disks, ports 140 (which could alternatively be components in a network interface 142), a disk driver 145, a network driver 150 (which could alternatively be a component in the network interface 142), and/or other known elements that are used in computing devices.

The computing device 105 also includes software elements 152 such as, for example, an operating system (OS) 155 that performs management functions and other functions that are known to those skilled in the art. The OS 155 can be one of various types of known OS 155 such as, for example, the Microsoft WINDOWS® based operating system, MAC OS®, MAC OS X®, iOS (mobile operating system), UNIX or UNIX-like OS, BSD and its descendant operating systems, LINUX AND GNU, Google CROME OS®, OS/2, or another operating system. It is noted that at least some of the above names for operating systems are registered trademarks. As will be discussed below, the inoculator 114 is configured to transmit a block object 160 (i.e., block 160 or wedge 160) onto the computing device 105 to prevent a known specific software program from being installed or executing in the computing device 105. The block object 160 is a data object that is an inert object (or a null object or a data object that does not perform a function and does not execute a function). This block object 160 is also alternatively referred herein as a "block 160" or a "wedge 160". A particular block object 160 will block the installation or execution of a particular computer program on the computing device 105, as will be discussed below in additional details. The computer program that will be blocked can be a malicious computer program or a non-malicious computer program.

The computing device 105 can also include a user interface 165 or/and other peripheral components. Of course, the user interface 165 may vary, depending on the type of computing device 105. For example, a user interface for a notebook computer can vary from a user interface for a PDA or a user interface for a smart phone. The interface 165 can be integrated with or can be coupled to and function with the computing device 105. As an example, the interface 165 for a personal computer can include at least one of the following: mouse (or control pad) 170, keyboard 176, and/or screen (or touchscreen) 180. A bus 153 can permit the above discussed components for the computing device 105 to communicate with and function together. Other standard hardware, software, or firmware components that can be used in the device 105 are not shown in FIG. 1 for purposes of clarity in the drawings.

The inoculator engine 114 is formed by software code based on a standard programming language (e.g., C, C++, or other suitable languages)

Figure 2:
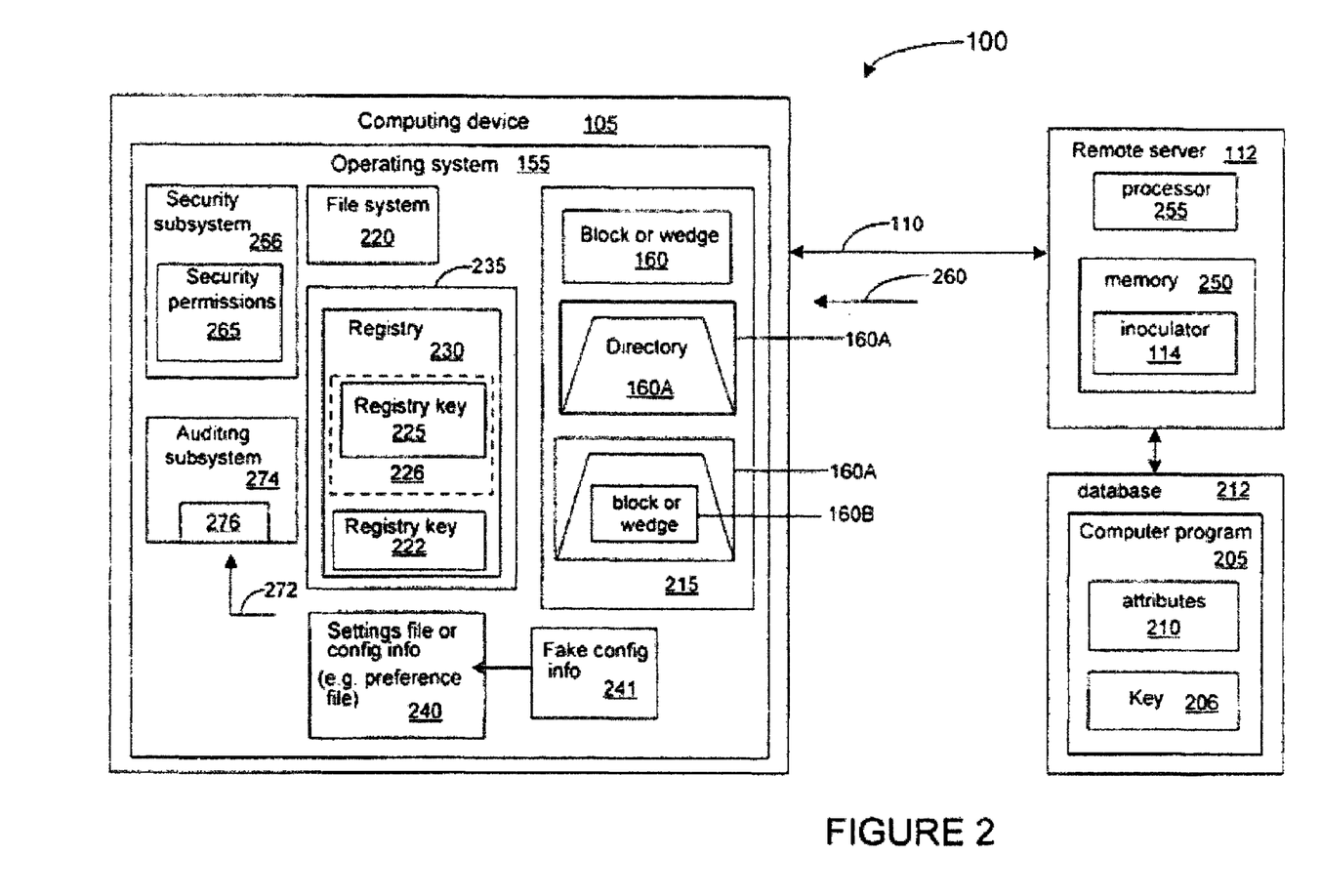
FIG. 2 is a block diagram showing various features in the apparatus of FIG. 1, in accordance with various embodiments of the invention.

FIG. 2 is a block diagram that shows additional details of the apparatus 100 of FIG. 1, in accordance with an embodiment of the invention. Assume that a known computer program 205 (i.e., unwanted or undesired computer program 205, or unwanted or undesired software program 205) is, for example, a known malware or a known non-malicious program. A malware could be, for example, viruses, worms, Trojan horses, backdoors, spyware, adware, botnets, or other malware or other programs that can have a malicious effect (or perform other undesired functions) on a computer. A non-malicious program could be, for example, peer-to-peer filesharing programs (or other types of computer programs that are non-malicious). Other non-malicious programs can be, for example, computer programs that execute computer games, videos, or other programs that a business would like to prevent from being installed (or re-installed) in the computing device 105 so that employees are not distracted and can remain productive in the workplace. The known computer program 205 could also be a recently discovered or recently analyzed malware program or non-malicious program that has previously infected the computing device 105 (or infected any other devices that are connected to the network 110 or connected to the computing device 105), has been previously deleted from the computing device 105, and then previously analyzed in its attributes 210. The attributes 210 of a computer program 205 can be stored in, for example, a separate remote database 212 or in a database in the remote server 112, or in another device (not shown in FIG. 2) that can be accessed by the remote server 112. Various methods for analyzing attributes of a computer program are known to those skilled in the art.

In one example, the computer program 205 has been previously installed in the computing dev-ice 105 (or another computing device that can communicate with the computing device 105 or can communicate on network 110).

Assume that computer program 205 has infected the computing device 105 (or another device that can communicate with the computing device 105 or can communicate on network 110). As one example, in order to remove the computer program 205 from the computing device 105, the Windows Management Interface (WMI) can be used to connect to the computing device 105. As known to those skilled in the art, WMI allows management and control of computing devices with a particular operating system such as, for example, Windows OS. As an example, the computing devices to be managed via WMI can be in a network such as, for example, an enterprise network. Network administrators can use WMI to query and set information on computing devices, applications, and networks. Use of WMI allows the administrator to use Microsoft-supported API (application program interface) calls to access the registry 230 (in the file system 220), and determine if a particular computer program 205 (malicious computer program or non-malicious computer program) has been installed in the computing device 105.

The administrator can use API calls to write data to a specific registry key 222. As an example, this specific registry key 222 is the registry key that is used from Microsoft service pack installations or updates, and this registry key will contain instructions about the particular files and registry keys to remove after a re-boot of the computing device 105. To remove a particular computer program 205 from the computing device 105, the instructions for removing the particular computer program 205 is written into the specific registry key 222. When the computing device 105 is re-booted, the operating system 115 will read the specific registry key 222 and will remove the particular computer program 205 (and also remove the registry key 206 for the computer program 205) from the computing device 105. The OS 155 performs this removal of the program 205 and registry key 206 based on the instructions in the registry key 222 for removing the particular program 205 and registry key 206. Therefore, features in the WMI can be advantageously used for cleaning (e.g., inoculating, removing or deleting or quarantining) a computer program 205 from the computing device 105. Based on the discussion herein, it is understood that other methods for removing a computer program 205 from the computing device 105 may also be advantageously used.

Assume that the attributes 210 of the known computer program 205 are then analyzed. Those skilled in the art can analyze a computer program to determine the following characteristics or details of the attributes 210. As an example, the attributes 210 indicate that the known program 205 has a software name "UNWANTED-1" and file extension "ext". Assume further that attributes 210 indicate that the known computer program 205 will be stored by the files system 220 into the location 215. As known to those skilled in the art, a file system is one of the subsystems in any operating system type (platform). Typically, the location 215 will be an area in the memory 125 (FIG. 1) of the computing device 105.

The attributes 210 may also indicate that the known program 205 will create the registry key 206 into the registry 230 (which is managed by the file system 220 and is in a memory area 235 of memory 125 (FIG. 1)), if the known program 205 is attempting to install into a WINDOWS-based operating system or is attempting to install in another type of operating system that uses a registry-type system for installed software.

As known to those skilled in the art, a registry is a database used by the Windows operating system to store configuration information about the computer program. Most computer programs would write data to the registry, at least during installation.

Those skilled in the art will realize that variations or alternatives in the configurations discussed herein can be made. For example and as discussed herein, some objects (or other storage components) that are stored in memory (e.g., Random Access Memory) may not be resident in the memory at all times, and stored on disk and loaded into memory when these objects are accessed. As a more specific example, some objects (or other storage components) such as the disk driver 145 (FIG. 1), the registry 230, and/or the file system 220 are typically stored on disk and may not be resident in RAM at all times, and loaded into RAM only when these objects (or storage components) are accessed.

Alternatively or additionally, the attributes 210 may indicate that the known program 205 will create a configuration information file 240 (i.e., settings file 240) if the known program 205 is attempting to install into a non-WINDOWs based operating system. The configurations file 240 effectively registers the known program 205 when the program 205 installs into the computing device 105. For example, in the MAC® OS® operating system, the configurations file 240 is a preference file 240. A computer program 205 would rebuild its preference file 240 if the preference file is deleted. It is within the scope of embodiments of the invention for the configuration file 240 to encompass any suitable configuration file or metadata file, or other data file that would be associated with a computer program 205 and that would be used by any suitable type of operating system that is not necessarily limited to the MAC OS operating system.

In an embodiment of the invention, an inoculator engine 114 can be stored in a memory 250 and can be executed by a processor 255 in the remote computing device 112 (which can be, for example and without limitations, a server or another type of computer). If the operating system 155 is a Windows operating system, then the administrator can permit the processor 255 to execute the inoculator engine 114. The inoculator engine 114 will read the attributes 210, including registry key 206, that has been stored or gathered in the database 212 and that are attributes or metadata associated with the known computer program 205. The attributes 210 would typically indicate the memory space or memory address space (in target device 105) that the computer program 205 will reside after installation or the file system location (in target device 105) in which the computer program 205 will reside after installation. The attributes 210 may also indicate the registry location 226 that will receive a registry key 206 of the undesired computer program 205.

In one embodiment of the invention, the inoculator engine 114 will provide and transmit 260 across network 110 a block object 160 (i.e., block 160 or wedge 160) onto the computing device 105 to prevent a known specific software program (e.g., known program 205) from being installed or executing in the target computing device 105. The block object 160 is a data object that is an inert object (or a null object or a data object that does not perform a function and does not execute a function). This block object 160 is also alternatively referred herein as a "block 160" or a "wedge 160" or a "dummy file 160" which does not execute but only occupies memory space. This block object 160 can be, for example, a given data of a particular size that does not perform any function and that occupies the memory space (or memory address space) of the known computer program 205 that is to be prevented from re-installing into the computing device 105.

A file system 220 of the OS 155 will install the block data 160 into a memory area 215. For a Windows type operating system, the file system 220 will also install a fake registry key 225 (null registry key 225) in a registry area 226 in which an unwanted computer program 205 would otherwise generate and install a registry key 206 when the unwanted computer program 205 will attempt to install. This null registry key 225 is also given data of a particular size that does not perform any function (i.e., does not execute) and that occupies the registry area 226 of the registry key 206 of the undesired computer program 205.

In another type of operating system, the file system 220 will install a fake configuration information 241 (null configuration information 241) into the configuration file 240, where this fake configuration information 241 is for the block object 160 (null object 160, data object 160, or dummy object 160). For MAC OS operating systems, this configuration file is commonly known as a preference file. The fake configuration information 241 is also an inert object or non-functioning data object. In other words, this null configuration information 241 is also given data of a particular size that does not perform any function (i.e., does not execute) and that occupies the memory area of the configuration information of an undesired computer program 205 to be installed in a non-Windows system.

The null registry key 225 (for Windows-based systems or other OS-types the use registry keys) is also referred herein and in the below claims as a null configuration object 225. The null configuration information 241 (for non-Windows-based systems) is also referred herein and in the below claims as a null configuration object 241. A null configuration object 225 (or 241) is associated with the null object 160 (data object 160).

It is noted that all types of operating systems (e.g., operating systems in mobile devices such as the iPad or iPhone or smart phones) have file systems. These file systems can then be used to install an embodiment of the block object 160 and/or an embodiment of the fake configuration information 241, in order to prevent the installation of an unwanted computer program 205 into a target device 105.

A particular block object 160 (data object 160) will block the installation (re-installation) or execution of a particular computer program 205 on the computing device 105. The computer program 205 that will be blocked can be a malicious computer program or a non-malicious computer program. When the program 205 attempts to re-install into the device 105, the block object 160 will occupy the memory area 215 that is the destination memory space of the program 205. As a result, the block object 160 prevents the program from re-installing into the device 105 and is an antibody (or antibody in functionality) that prevents the program 205 from installing into or re-infecting the device 105. Since the block object 160 is in the destination memory space 215 of the program 205, the program 205 will not be able to install and will be subject to an error occurrence.

As known to those skilled in the art, for a computer program that installs into a Windows operating system, that computer program will also register in the registry. In an embodiment of the invention, the inoculator engine 114 would also provide and transmit 260 a fake registry key 225 (or dummy registry key 225 or substitute registry key 225) into the registry 230. This fake registry key 225 is associated with the block object 160. The operating system 155 will install the fake registry key 225 in the registry 230 as a substitute for the actual registry key 206 of the computer program 205. This fake registry key 225 is installed in the area 226 of the registry 230 where the computer program 205 (e.g., a malware 205 or non-malicious program 205) would create a registry key 206 during the installation of the computer program 205 into the target device 105. Since the fake registry key 225 is already installed in the registry 230 when the computer program 205 is attempting to install into the target device 105, the computer program 205 will encounter an error because the computer program 205 will be unable to delete the fake registry key 225.

Therefore, the block data 160 and/or fake registry key 225 will block the target device 105 areas in which the computer program 205 will need to "live" or install.

In one embodiment of the invention, the computer program 205 will be unable to delete the fake registry key 225 because the security permission settings 265 (which is managed by the security subsystem 266) will prevent the computer program 205 from modifying the value of the fake registry key 225 into a proper value associated with the undesired program 205. As a result, the computer program 205 will not successfully install in the target device 105 and the target device 105 is protected from re-infection by the computer program 205. A creator of the computer program 205 would have to, for example, change the name of the computer program 205 or use different registry keys other than the registry key 206 for the program 205, in order to potentially allow successful installation of the computer program 205 into the device 105.

In another embodiment of the invention, the security permission 265 in the OS 155 can be set for the block object 160 so that the unwanted computer program 205 is unable to modify or replace the installed block object 160. For example, the security permission 265 may be set so that only a network administrator can modify the installed block object 160. The security permissions 265 for data objects can be set by use of the security subsystem 266 and can be remotely set or configured, via network 110, by a network administrator. The security permission 265 settings provide a security or a guard against an unwanted software program 205 from successfully over-writing, deleting, replacing, or modifying the block object 160. The security subsystem 266 sets the security permissions 265 for the block object 160 and/or for the null registry key 225.

Assume that the name of the unwanted computer program 205 is "UNWANTED-1". In another embodiment of the invention, to prevent the unwanted software program 205 from successfully over-writing, deleting, replacing, or modifying the block object 160 which blocks future access of the computer program 205 into memory space 215, the network administrator or user can change, via file system 220 and security subsystem 266, the type of the block object 160 but keep the name of the block object to be the same. For example, the network administrator can change the block object 160 from a file object 160 into a directory 160A which is a different type of object from a file object. The name of the directory 160A will be the same as the previous file object 160 which is "UNWANTED-1". When the unwanted computer program 205 (with the name "UNWANTED-1") tries to install into the memory area 215 in the future, the unwanted computer program 205 will not be able to install because of a name collision with the directory 160A which has the same name "UNWANTED-1". This name collision will cause the OS 155 to trigger an error code, which can alert the network administrator or user of target device 105 of an attempted installation into the target device 105 by an unwanted computer program 205.

In another embodiment of the invention, to prevent the unwanted software program 205 from successfully over-writing, deleting, replacing, or modifying the directory 160A (which, as mentioned in the above example, is named "UNWANTED-1"), the network administrator or user can, via file system 220 and security subsystem 266, place another block object 160B in the directory 160A which is in memory area 215. As with the block object 160 in the above examples, the block object 160b is also a non-functioning or non-executing piece of data object. The block object 160B can have a name (e.g., "UNWANTED-2") which is different from the name of the block object 160 or can have a same name (e.g., "UNWANTED-1") as the name of the block object 160. Since the block object 160B is in the directory 160A, the unwanted computer program 205 will not be able to delete or modify the directory 160A when the computer program 205 attempts to install into the target device 105 in the future.

In another embodiment of the invention, the OS 155 can be programmed to generate a security event 272, if the fake registry key 225 is attempted to be accessed, modified, or deleted by an intruding computer program 205 that is attempting to install or re-install into the target device 105, or if the block object 160 is attempted to be accessed, modified, or deleted by an intruding computer program 205 that is attempting to install or re-install into the target device 105. The OS 155 (e.g., via security subsystem 266) can trigger this security event 155 if a computer program 205 attempts to access (e.g., attempted reading, attempted writing, attempted modification, or attempted deletion) a data object in a particular memory area 215 and/or particular registry area 226. This security event 272 is then transmitted to the auditing subsystem 274, and the subsystem 274 can record this security event 275 into a security event log 276. Various commercially available software and open source software can be used to read and analyze the security event log 276. Effectively, the security event 272 is a "trip wire" or "burglar alarm" that alerts the network administrator or user of target device 105 when a computer program 205 is trying to install into the target device 105 and accesses or attempts to modify or delete the fake registry 225 and/or the block object 160. In another embodiment of the invention, the above-discussed security event 272 feature is omitted.

In an example operation that is a non-limiting example, assume that a piece of software 205 (which can be malicious or non-malicious) registers as a service in a computer system with, for example, a Microsoft Windows operating system or other type of operating systems. In the Windows OS, assume that the software 205 registers under the registry key 206 named "current control set/services" and the service name is "bad-software". When this software 205 installs or infects the target device 105, the software 205 creates that registry key 206 into the registry 230. The software 205 can be cleaned (e.g., deleted or removed) from the target system 205 by use of methods as, for example discussed above.

When the attributes 210 of this software 205 has been analyzed and recorded (e.g., in database 212), the inoculator engine 114 can place an antibody into the target system 105 to prevent the software 205 from installing into the target device 105 in the future. As discussed above, this antibody can be a block object 160 (wedge 160), directory 160A which would have the same name as the software 205, directory 160A with a block object 160B, fake registry key 225 that is associated with the block object 160, and/or fake configuration information 241 that is associated with the block object 160. The above components in an antibody can differ based on, for example, the type of operating system and/or the amount of security that the network administrator prefers to place on a block object 160, directory 160A, registry key 225, and/or fake configuration information 241, as discussed above.

The inoculator engine 114 would open the registry 235, via remote procedure calls (RPCs) along network 110. RPCs are built-in capabilities in the Microsoft based operating systems. As known to those skilled in the art, RPC is a type of protocol that allows a program on one computer to execute a program in another computer. The program in one computer sends a message to the other computer with appropriate arguments and the other computer returns a message containing the results of the program executed.

The inoculator engine 114 would create a registry key named as "bad-software" underneath the "current control set/services" registry path. Therefore, the inoculator engine 114 creates a registry key of the same name that would have been created by the program 205 attempted to install into the target device 105.

As similarly discussed above, the inoculator engine 114 can be used to set the security permission 265 on the registry key 225. For example, the security permission 265 would prevent read access and write access to the registry key 225 for anyone except the owner of the registry key 225. The owner of the registry key 225 is typically the network administrator.

In this same example, assume that later, the user of device 105 is browsing the Internet or another networks, and the same program 205 (named "bad-software") attempts to exploit the target device 105. The "bad-software" program 205 will create its registry key 206 (named "current control set/services/bad-software") and attempt to install its registry key 206 into the registry 230, as the program 205 is attempting to install into the target device 105. Since the registry key 225 was previously installed in the registry 230, an access denied error would be generated in a code line in the program 205. This error code is generated because the registry key 225 is already installed in the registry 230 and indicates that access to the registry area occupied by registry key 225 is denied for the program 205. Since the program 205 will typically not have the proper security permission credentials to over-write or modify the registry key 225, the error code is generated. The program 205 will have no programming response for dealing with this error code, the program 205 will be unable to successfully complete installation into the target device 105 and when the target device 105 is re-booted, the program 205 is deleted by the OS 155 from the target device 105 because the proper registry key and file path is not installed for the program 205 to survive during re-boot of the target device 105.

In another embodiment of the invention, the antibodies discussed above (e.g., block object 160, directory 160A, registry key 225, and/or fake configuration information 241) can be placed in a target device 105 that has not been previously infected by the computer program 205. This solution permits active inoculation of target devices 105 against exploits by known unwanted software 205.

Therefore, in an embodiment of the invention, an apparatus and/or method is provided with an inoculator and antibody for computer security. A block object (i.e., block or wedge) is installed onto a target computing device 105 (i.e., target computer 105 or computing system 105 in FIG. 1), where the block object prevents a specific known software program from being installed and executing in the target computing device. As an example, this block object can be installed from a remote device, via a network, to the target device 105 by use of Microsoft Windows RPC calls. The solution provided by an embodiment of the invention advantageously does not require the installation of a software agent on the target device. Instead, the solution provides data objects, files, and/or registry keys to prevent installation of an unwanted computer software program 205. Thus, an embodiment of the invention advantageously avoids the prior solutions' use of agents, active running code, behavioral block software, or other prior solutions that can be expensive or can consume system resources. The target system in the target device can be, for example, the Microsoft Windows OS, although other types of operating systems can be protected by an embodiment of the invention. Once the block object is installed ("wedged") in the target system, the target system will be protected or immune against the specific unwanted software program that tries to install or execute in the target system. As discussed above, fake registry keys, along with the block object, may also be used to protect the target system.

The solution provided by an embodiment of the invention can make a target system immune against specific malicious software program (typically called "malware"). However, the solution provided by an embodiment of the invention can also make a target system immune against non-malicious software as selected by a network administrator or other users.

Figure 3:
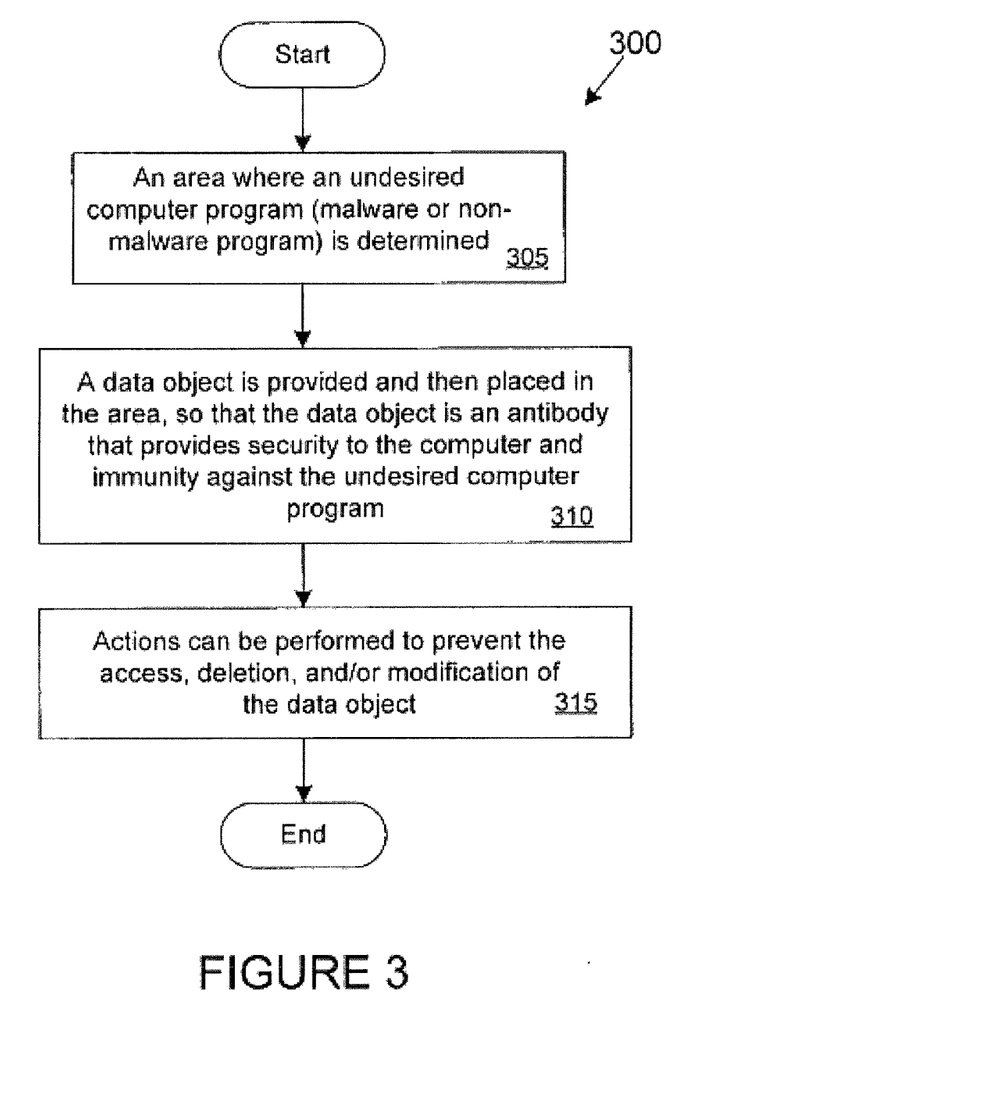
FIG. 3 is a block diagram of a method in accordance with an embodiment of the invention.

FIG. 3 is a block diagram of a method 300 in accordance with an embodiment of the invention. An area where an undesired computer program will reside is first determined (block 305). A data object is then placed in the area, so that the data object is an antibody that provides security to the computer and immunity against the undesired computer program (block 310). As an optional step in block 315, actions can be performed to prevent the access (e.g., deletion and/or modification) of the data object. As discussed above, preventing the access, deletion and/or modification of the data object can include setting security permissions for the data object, modifying the type of the data object, or placing a second data object into the data object.

In another embodiment of the invention, the access (e.g., deletion and/or modification) to the null registry key 225 (or null configuration information 241, if applicable) can also be prevented by, for example, setting security permissions for the null registry key 225 or null configuration information 241, by use of the security subsystem 266.

Prior to determining the area in block 305, the undesired computer program can be cleaned (inoculated) from the computer or another device in a network.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored, including embedded devices such as Field Programmable Gate Arrays (FPGAs) or other specialized equipment. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method performed by a first computing device, the method comprising:
   determining, in a second computing device that is distinct and separate from the first computing device, a location where an undesired computer program is configured to reside upon installation on the second computing device; and
   providing, to the second computing device, a data object to occupy the determined installation location of the undesired computer program in the second computing device to prevent the undesired computer program from being installed in the determined installation location in the second computing device.

2. The method of claim 1, further comprising:
   providing a null configuration object in a second location in the second computing device, wherein the null configuration object is associated with the data object.

3. The method of claim 1, further comprising:
   preventing a deletion or modification of the data object.

4. The method of claim 3, wherein preventing the deletion or modification of the data object comprises:
   setting a security permission for the data object.

5. The method of claim 3, wherein preventing the deletion or modification of the data object comprises:
   setting the data object to have an object type that differs from the undesired program.

6. The method of claim 5, wherein preventing the deletion or modification of the data object comprises:
   placing a second data object in the data object.

7. The method of claim 1, wherein the location comprises a memory space and/or a file system location.

8. The method of claim 1, wherein the data object has the same name as the undesired computer program.

9. A first computing device, comprising:
   one or more processors; and
   memory storing one or more programs for execution by the one or more processors, the one or more programs including instructions for:
      determining, in a second computing device that is distinct and separate from the first computing device, a location where an undesired computer program is configured to reside upon installation on the second computing device; and
      providing, to the second computing device, a data object to occupy the determined installation location of the undesired computer program in the second computing device to prevent the undesired computer program from being installed in the determined installation location on the second computing device.

10. The first computing device of claim 9, wherein the one or more programs include instructions for:
   providing a null configuration object in a second location in the second computing device, wherein the null configuration object is associated with the data object.

11. The first computing device of claim 9, wherein the location comprises a memory space and/or a file system location.

12. The first computing device of claim 9, wherein the data object has the same name as the undesired computer program.

13. A non-transitory computer readable storage medium storing one or more programs for execution by one or more processors of a first computing device, the one or more programs including instructions for:
   determining, in a second computing device that is distinct and separate from the first computing device, a location where an undesired computer program is configured to reside upon installation on the second computing device; and
   providing, to the second computing device, a data object to occupy the determined installation location of the undesired computer program in the second computing device to prevent the undesired computer program from being installed in the determined installation location on the second computing device.

14. The computer readable storage medium of claim 13, wherein the one or more programs include instructions for:
   providing a null configuration object in a second location in the second computing device, wherein the null configuration object is associated with the data object.

15. The computer readable storage medium of claim 13, wherein the one or more programs include instructions for:
  preventing a deletion or modification of the data object.

16. The computer readable storage medium of claim 15, wherein preventing the deletion or modification of the data object comprises:
  setting a security permission for the data object.

17. The computer readable storage medium of claim 15, wherein preventing the deletion or modification of the data object comprises:
  setting the data object to have an object type that differs from the undesired program.

18. The computer readable storage medium of claim 17, wherein preventing the deletion or modification of the data object comprises:
  placing a second data object in the data object.

19. The computer readable storage medium of claim 13, wherein the location comprises a memory space and/or a file system location.

20. The computer readable storage medium of claim 13, wherein the data object has the same name as the undesired computer program.

\* \* \* \* \*